(12) United States Patent
Lences et al.

(10) Patent No.: US 6,362,280 B1
(45) Date of Patent: Mar. 26, 2002

(54) EMULSIBLE POLYOLEFIN WAX

(75) Inventors: Charles F. Lences, Morris County; Peter F. Romeo, Essex County; Manfred Seven, Morris County, all of NJ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/067,355

(22) Filed: Apr. 27, 1998

(51) Int. Cl.[7] .............................................. C08L 33/02
(52) U.S. Cl. ....................... 525/221; 525/263; 525/285; 525/351; 525/345; 525/386; 528/271
(58) Field of Search ................................ 525/221, 263, 525/285, 301, 345, 386; 528/271

(56) References Cited

U.S. PATENT DOCUMENTS

| | | | |
|---|---|---|---|
| 2,973,344 A | 2/1961 | Fasce ........................ 260/78 |
| 3,236,917 A | 2/1966 | Natta et al. | |
| 3,284,380 A | 11/1966 | Davis ........................ 260/8 |
| 3,414,551 A | 12/1968 | Reid et al. ................. 260/88.2 |
| 3,481,910 A | 12/1969 | Brunson ..................... 260/78.4 |
| 3,484,403 A | 12/1969 | Brunson et al. ............. 260/23 |
| 3,642,722 A | 2/1972 | Knowles et al. | |
| 3,658,948 A | 4/1972 | McConnell ................. 260/897 |
| 3,856,889 A | 12/1974 | McConnell ............ 260/897 B |
| 3,862,265 A | 1/1975 | Steinkamp et al. ......... 260/878 |
| 3,928,497 A | 12/1975 | Ohmori et al. ............. 260/878 |
| 4,028,436 A | 6/1977 | Bogan et al. ............... 260/878 |
| 4,071,581 A | 1/1978 | Yokoyama .................. 260/878 |
| 4,147,740 A | 4/1979 | Swiger et al. .............. 260/878 |
| 4,177,336 A | 12/1979 | Seven et al. ................ 525/325 |
| 4,315,863 A | 2/1982 | Tomoshige et al. ......... 260/346 |
| 4,358,564 A | 11/1982 | Ames ........................ 525/261 |
| 4,376,855 A | 3/1983 | Ames ........................ 528/271 |
| 4,382,128 A | 5/1983 | Li ............................ 524/513 |
| 4,506,056 A | 3/1985 | Gaylord ..................... 524/445 |
| 4,613,679 A | * 9/1986 | Mainord ..................... 560/190 |
| 4,639,495 A | 1/1987 | Waggoner ................... 525/285 |
| 4,670,349 A | 6/1987 | Nakagawa et al. ......... 428/516 |
| 4,698,395 A | 10/1987 | Inoue et al. ................ 525/327 |
| 4,762,882 A | 8/1988 | Okano et al. ................ 525/74 |
| 4,762,890 A | 8/1988 | Strait et al. ................ 525/257 |
| 4,788,264 A | 11/1988 | Ukita ........................ 525/285 |
| 4,795,792 A | 1/1989 | Ohtani et al. .............. 526/201 |
| 4,810,612 A | 3/1989 | Ueda et al. ................ 430/109 |
| 4,849,489 A | 7/1989 | Benhamou et al. ......... 526/208 |
| 4,859,752 A | 8/1989 | Bosanec et al. ............ 526/209 |
| 4,880,470 A | 11/1989 | Hyche et al. ............... 106/271 |
| 4,888,393 A | 12/1989 | Cesare et al. ............... 525/285 |
| 4,927,888 A | 5/1990 | Strait et al. ................ 525/285 |
| 5,001,197 A | 3/1991 | Hendewerk .................. 525/285 |
| 5,059,658 A | 10/1991 | Sezume et al. ............. 525/263 |
| 5,096,493 A | 3/1992 | Hyche et al. ............... 106/271 |
| 5,153,029 A | 10/1992 | Sharma ...................... 427/213 |
| 5,190,579 A | 3/1993 | Gose et al. .................. 106/18 |
| 5,204,022 A | 4/1993 | Sharma ...................... 252/363 |
| 5,290,954 A | 3/1994 | Roberts et al. ............. 549/233 |
| 5,310,806 A | 5/1994 | Wild et al. ................. 525/285 |
| 5,356,998 A | 10/1994 | Hobes ........................ 525/285 |
| 5,360,862 A | 11/1994 | Roberts et al. ............. 524/560 |
| 5,367,022 A | 11/1994 | Kiang et al. ................ 525/74 |
| 5,389,440 A | 2/1995 | Arpin et al. ................ 428/391 |
| 5,420,303 A | 5/1995 | Roberts et al. ............. 549/233 |
| 5,461,113 A | 10/1995 | Marczinke et al. ......... 525/193 |
| 5,492,976 A | 2/1996 | Shalati et al. .............. 525/285 |

FOREIGN PATENT DOCUMENTS

| | | |
|---|---|---|
| EP | 0 024 034 | 8/1980 |
| EP | 0 408 470 A1 | 7/1990 |
| WO | WO 94/04577 | 3/1994 |
| WO | WO 96/06120 | 2/1996 |

* cited by examiner

*Primary Examiner*—Duc Truong
(74) *Attorney, Agent, or Firm*—Synnestvedt & Lechner LLP

(57) ABSTRACT

An emulsible polyolefin wax having sufficient functionality to be emulsible in an aqueous medium, a melt viscosity of less than 1,000 cps at 190° C., and an emulsion light transmittance of at least 10% at 525 nm with a 20 mm light pathlength.

18 Claims, 1 Drawing Sheet

Co-Emulsions of Wax 597 With High Molecular Weight PP

EMULSIBLE POLYOLEFIN WAX

FIELD OF INVENTION

The present invention relates to a functionalized polyolefin wax. More specifically, this invention relates to an emulsible polyolefin wax from which high clarity emulsions can be prepared.

BACKGROUND OF THE INVENTION

Emulsible polyolefin waxes are well known and are commonly used in glossy, protective substrates such as floor polish and the like. As used herein, the term "wax" refers to a substance having the following properties: (a) solid at room temperature; (b) low melting point; (c) solidifies when cooled; (d) low viscosity at just above the melting point; and (e) insoluble in water. A "polyolefin wax" as used herein is a substance having the aforementioned properties and is prepared either from thermal or chemical degradation of a polyolefin or from partial polymerization of olefins.

In floor polish and other conventional coating applications, the polyolefin wax is emulsified. To this end, the wax must be functionalized to make it emulsible in an aqueous medium. It is also highly desirable that the polyolefin wax emulsion be clear and colorless so as not to obscure or otherwise tinge the surface which it coats and protects.

Unfortunately, emulsions of conventional polyolefin waxes tend to be low in clarity and high in color. This is due, in part, to the general lack of colorless polyolefin wax. The problem is compounded by the process of functionalizing which tends to color and reduce emulsion clarity of the polyolefin wax. Therefore, there is a need for an emulsible polyolefin wax that is not only highly emulsible, but also clear and colorless. The present invention fulfills this need among others.

DESCRIPTION OF THE INVENTION AND PREFERRED EMBODIMENTS

Figure 1:
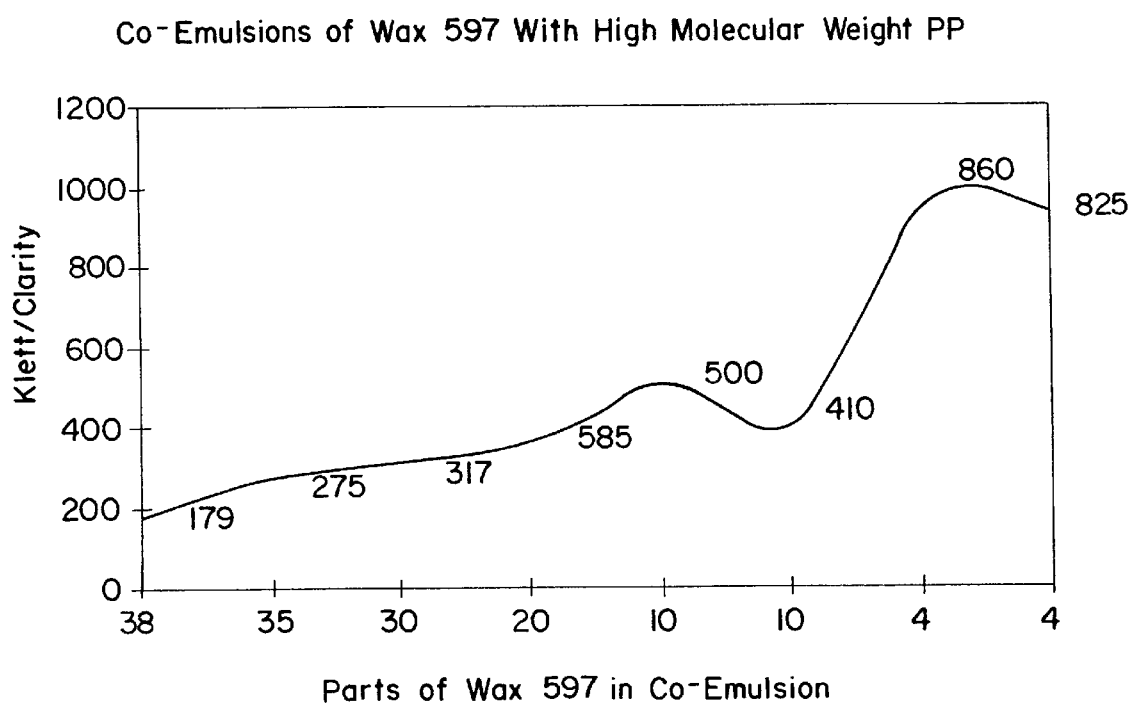
FIG. 1 shows a plot of clarity/Klett number of an emulsion made from the emulsible polyolefin of the present invention mixed with a non-emulsible polypropylene as a function of the polypropylene's molecular weight.

The present invention provides for a highly-emulsible, functionalized polyolefin wax having exceptionally high emulsion clarity. More specifically, an approach has been developed to functionalize a commercially-available, exceptionally low color polyolefin wax starting material without substantially altering its aesthetic properties. The highly emulsible polyolefin wax produced not only forms high clarity emulsions for a variety of uses, but also acts as a carrier to emulsify other more difficult to emulsify substances.

One aspect of the present invention is the provision of a high-clarity, emulsible polyolefin wax (herein "emulsible polyolefin wax"). In a preferred embodiment, the emulsible polyolefin wax has sufficient functionality to be emulsified in an aqueous medium, a melt viscosity of less than 1,000 cps at 190° C., and an emulsion light transmittance of at least 10% at 525 nm with a 20 mm light pathlength. In another preferred embodiment, the emulsible polyolefin wax has sufficient functionality to be emulsible in an aqueous medium, and an emulsion light transmittance of at least 50% at 525 nm with a 20 mm light pathlength.

Another aspect of the invention is the provision of a process in which a polyolefin wax starting material (herein "starting material") is functionalized to produce the emulsible polyolefin wax above. In a preferred embodiment, the process comprises reacting a starting material having a Gardner color of no greater than about two with an ethylenically unsaturated polycarboxylic compound (herein "polycarboxylic compound") by slowly adding the polycarboxylic compound to an agitated reactor charged with the starting material. In another preferred embodiment, the process comprises blending the starting material with a second polyolefin wax having a molecular weight greater than that of the starting material, and functionalizing the blend by slowly adding a polycarboxylic compound to an agitated reactor charged with the blend.

Yet another aspect of the present invention is the provision of a composition comprising the emulsible polyolefin wax above. In a preferred embodiment, the composition is an emulsion.

Still another aspect of the invention is the provision of a floor polish comprising the emulsion above.

Yet still another aspect of the invention is a method of using the emulsible polyolefin wax to emulsify substances. In a preferred embodiment, the method comprises mixing the functionalized polyolefin with a second substance, which is not ordinarily emulsible, in an aqueous medium under conditions sufficient to form an emulsion.

The above aspects of the present invention relate to an emulsible polyolefin wax having adequate functionality to be emulsible in water and having relatively high emulsion clarity and low color compared to prior art waxes. The emulsible polyolefin wax has an emulsion % transmittance at 525 nm with a 20 mm light pathlength of at least 10%, preferably at least about 20%, more preferably at least about 30%, still more preferably at least about 40%, and even more preferably at least about 50%. In the most preferred embodiment, the wax has an emulsion % transmittance of at least about 55%.

In a preferred embodiment, the emulsible polyolefin wax of the present invention has a Gardner color index of no greater than about 9 and, more preferably, it is no greater than about 8. In the most preferred embodiment, the wax has a Gardner color of no greater than about 7.

Both clarity and color are related somewhat to the particle size of the emulsible polyolefin wax in an emulsion. A relative measure of particle size is the Klett number. The emulsible polyolefin wax of the present invention has a Klett number of preferably no greater than about 75, more preferably no greater than about 50, and even more preferably no greater than about 30.

The emulsible polyolefin wax should have sufficient functionality to be emulsible in an aqueous medium. The type and degree of functionalization may vary according to the application and desired ease of emulsification. That is, although more functionalized waxes tend to be more readily emulsified, they also tend to increase in color and drop in molecular weight (Mw) and emulsion clarity. The degree of functionalization therefore is an optimization of color, emulsion clarity, Mw and the ease of emulsification.

One measure of a compound's ability to be emulsified is its saponification number—the higher the number, the more readily the compound is emulsified. In a preferred embodiment, the emulsible polyolefin wax has a saponification number from about 1 to about 500 mg KOH/g, more preferably, from about 20 to about 150 KOH/g, and even more preferably from about 40 to about 85 KOH/g.

The emulsible polyolefin wax of the present invention should have a melt point/peak ($T_m$) such that it is a solid at room temperature but melts at a temperature which is convenient for processing. In a preferred embodiment, the wax has a $T_m$ of about 50 to about 200° C., more preferably, from about 100 to about 150° C., and even more preferably from about 130 to about 145° C.

The viscosity and Mw of the present invention can vary depending upon the desired properties as required by the application. As used herein, Mw is based on gel permeation chromatography (GPC) unless otherwise indicated. It has been found that satisfactory results have been obtained in a variety of application using an emulsible polyolefin wax having a Mw of no greater than about 50,000 and a viscosity of no greater than about 2,500 cps at 190° C. Preferably, the wax has a Mw of no greater than about 25,000 and a viscosity of no greater than about 1,000 cps at 190° C. More preferably, the wax has a Mw of about 10,000 to about 20,000 and a viscosity of about 200 to about 800 cps at 190° C.

A highly preferred embodiment of the emulsible polyolefin wax has the following physical properties: Mw about 14,000; Mz about 36,000; Mn about 3,100; saponification number about 75 to about 85 KOH/g; Gardner color of below 7 to about 8; viscosity about 300 to about 800 cps @ 190° C.; drop point about 142–148° C.; melt point about 133 Tm DSC ° C.; and hardness about 0.1 to about 0.3 DMM.

The emulsible polyolefin wax of the present invention is prepared by functionalizing a starting material with a polycarboxylic compound without substantially altering the aesthetic properties of the starting material. Therefore, the properties of the functionalized wax, other than its ability to emulsify, are, in large part, dependent upon the polyolefin wax starting material. In other words, it is important that the starting material have excellent color and clarity. The starting material has preferably a Gardner color of no more than 2, and more preferably no more than 1.

Suitable polyolefin wax starting materials include, for example, thermally degraded homopolymers and copolymers of ethylene, propylene, 1-butene, 4 methyl-1-pentene, 3-methyl-1-butene, 4,4-dimethyl-1-pentene, 3-methyl-1-pentene, 4-methyl-1-hexene, 5-ethyl-1-hexene, 6-methyl-1-heptene, 1-hexene, 1-heptene, 1-octene, 1-nonene, 1-decene, and the like. These homopolymeric or copolymeric crystallizable poly-alpha-olefins are prepared by conventional polymerization processes for preparing polymeric materials. Preferably, the polyolefin starting material is a polypropylene or a copolymer of propylene and ethylene wherein the concentration by weight of ethylene is less than about 10%, and more preferably less than about 2%. The starting material of the present invention is commercially available, for example, through AlliedSignal (Morristown, N.J.) under the name ACX1089.

A highly preferred starting material has the following physical properties: Mw about 7,500; Mz about 11,200; Mn about 3,000; and Gardner color of below 1.

The starting material is functionalized with a moiety that enables the wax to be emulsified. A preferred functional group for this purpose is derived from an ethylenically unsaturated polycarboxylic compounds such as unsaturated polycarboxylic acids anhydrides and esters thereof. Suitable compounds include, for example, maleic acid, maleic anhydride, fumaric acid, citraconic anhydride, aconitic anhydride, itaconic anhydride, dimethyl maleate, dimethyl fumarate, methyl ethyl maleate, dibutyl maleate, diptopyl maleate, and the like, as well as those compounds, such as, for example, citric acid, which form these compounds at reaction temperatures. In a preferred embodiment, the functional group is derived from maleic anhydride. Maleic anhydride is commercially available, for example, though Monsanto Company (St. Louis, Mo.) as Maleic Anhydride, and Huntsman Petrochemical Corporation (Chesterfield, Mo.) as Manbri Maleic Anhydride.

The amount of ethylenically unsaturated polycarboxylic compound used in functionalizing the polyolefin wax can vary from about 01% to about 25 wt % of the polyolefin wax, and is preferably about 5 to 15 wt %, more preferably 8 to 12 wt %, and most preferably about 10 wt %. Amounts of polycarboxylic compound much over 10 wt % tend to cause the color of the resulting functionalized polyolefin wax to be dark, whereas lower amounts tend to not adequately react with the polypropylene wax to provide a clear emulsion or tend to react very slowly.

In addition to monitoring the amount of polycarboxylic compound added to the reaction, it is important to monitor the concentration of unreacted polycarboxylic compound in the reaction. That is, in concentration, the polycarboxylic compound, e.g. maleic anhydride, tends to undergo undesirable homopolymerization polymerization. The polymerization product is highly objectionable since it has a dark color, and tends to become dispersed in the functionalized polyolefin wax.

Accordingly, the process of the present invention minimizes the concentration of polycarboxylic compound through several approaches. First, it has been found that the polycarboxylic compound should be added slowly to a much larger mass of polyolefin starting material. The larger mass of starting material is believed to serve as a diluent to the unreacted polycarboxylic compound, minimizing its concentration, and thereby minimizing its polymerization. Additionally, it has been found that superior results are achieved when the polycarboxylic compound is fed slowly to the reaction. It is generally preferred to feed the polycarboxylic compound as slowly as economically practical. For example, in a batch reaction, the feed rate is preferably about 1 to about 5 wt % of starting material per hour, more preferably about 2 to about 4 wt % of starting material per hour, and even more preferably about 3 wt % of starting material per hour. Yet another approach to minimizing concentration of unreacted polycarboxylic compound is to ensure that there are no concentrated "pockets" of unreacted polycarboxylic compound in the reaction mass. As used herein, the "reaction mass" refers to the totality of the materials in the reactor including unreacted starting material, unreacted polycarboxylic compounds, initiators, catalysts, reagents, diluents, product and by-products. To ensure a homogeneous reaction mass, it is important that the reaction mass be mixed uniformly in an agitated reactor. An impeller type agitator is preferred.

The duration of the reaction is dependent upon the feed rate and the desired degree of functionalization. Generally, longer reaction times are preferred to minimize feed concentrations of polycarboxylic compound as discussed above. Reaction times, however, are constrained in length by economic/productivity considerations. It has been found that adequate product/productivity is achieved with a reaction period of about 0.5 to about 10 hours, preferably about 1 to about 5 hours, and more preferably about 2 to about 4 hours.

Functionalization according to the present invention is conducted at a temperature above the melting point of the starting material but no greater than about 200° C. The temperature is dependent upon the type of polyolefin and class of free radical initiators. At temperatures much below about 150° C., the starting material will not be in the molten form and therefore will not adequately react with the polycarboxylic compound. However, at temperatures above about 200° C., the ease of emulsification and melt viscosity of the resulting emulsible polyolefin wax is not as high as preferred. Therefore, reaction temperature is generally between about 150 and about 200° C., and preferably between about 180 and about 190° C. At the aforesaid temperatures, the polycarboxylic compound is a gas or liquid with little solubility in the starting material.

The reaction pressure depends, among other things, upon the reaction temperature and desired rate of reaction. Generally, the reaction is conducted under a pressures preferably from about 5 to about 100 psi, more preferably from about 2 to about 25 psi, and most preferably at around atmospheric. Reactions conducted at or around atmospheric pressure avoid expensive high pressure equipment.

During functionalization, it may be preferable to enhance free radical formation. Enhancing free radical formation is known in the art and includes, for example, heating the reaction, or, preferably, employing a free radical source. Suitable free radical sources include, for example, dialkyl peroxides, tertiary butyl hydroperoxide, cumene hydroperoxide, p-menthane peroxide, p-menthane hydroperoxide or axo compounds, such as azobis (isobutyronitrile), or irradiation sources. Suitable irradiation sources include, for example, those from cobalt, uranium, thorium sources, and the like and ultraviolet light. The preferred free radical sources are the peroxides with the butyl peroxides being more preferred. The most preferred peroxide, due to availability and suitable good results obtained thereby, is ditertiary butyl peroxide (di-t-butyl peroxide). These compounds are commercially available through, for example, Elf Atochem as Lupersol 101 or Dit-Butyl Peroxide, and Akzo Nobel Chemicals Inc. as Trigonox B.

The amount of peroxide or free radical agent used is generally quite low, being of the order of about 0.01 to about 5 wt % based on the starting material, preferably about 0.1 to about 3 wt % with about 0.75 to about 1.25 wt % being most preferred. Amounts much above 5 wt % are not needed for good properties whereas amounts below about 0.01 wt % provide reactions that are too slow and incomplete.

Like the polycarboxylic compound feed, it is highly preferable that the free radical initiator be added to the reaction mass slowly. The free radical initiator is added to the reaction at a rate of preferably about 0.01 to about 3 wt % of the starting material per hour, more preferably about 0.1 to about 1 wt % of the starting material per hour, and even more preferably about 0.3 wt % of the starting material per hour.

The functionalization process can be conducted either in a batchwise or continuous manner, however, batchwise reactions are generally preferred due to reproducibility, and superior product quality.

Once an acceptable level of functionalization has been achieved, the unreacted polycarboxylic compound can be separated from the reaction mixture by purging the reaction mixture with an inert gas, such as nitrogen, while the reaction mixture is at the reaction temperature. After the unreacted polycarboxylic compound has been removed, the functionalized polypropylene wax can be further purified by a vacuum stripping or solvent extraction.

Although the starting material as disclosed herein produces an emulsible polyolefin wax having excellent clarity and color, it may be preferable, in certain applications, to improve the toughness of compositions comprising the emulsible polyolefin wax. To this end, the present invention provides for the blending of at least a second polyolefin wax to the starting material, and then functionalizing the blend thereof accordingly. The second polyolefin wax preferably has a Mw higher than that of the starting material even though its clarity and color may be less. This way, the user can blend the waxes together to optimize clarity and toughness of the resulting functionalized blend. It should be understood that the feed rate provided above for the polycarboxylic compound and the free radical initiator should be adjusted accordingly to account the composition of the polyolefin wax blend to be functionalized. The rates, therefore, would be based on the weight of the blend of starting materials.

Waxes having higher Mw than the starting material of the present invention are well known and many will be apparent to one skilled in the art. It has been found though that good results have been obtained by blending ACX1089 with ACX1172 (also available through AlliedSignal). The mixing ratios of the two waxes can vary considerably depending upon the properties desired. Suitable results, however, have been obtained with an ACX1089 to ACX1172 weight ratio of about 20:80 to about 80:20, with a 50:50 ratio being more preferred.

A highly preferred embodiment of the functionalized blend of polyolefin waxes has the following properties: Mw about 20,600; Mz about 41,700; Mn about 4,200; saponification number about 42 to about 44 KOH/g; Gardner color of below 3 to about 6; viscosity about 1,000 cps @ 190° C.; drop point about 150° C.; melt point about 138 Tm DSC ° C.; and hardness about 0.1 to about 0.3 DMM.

The emulsible polyolefin wax produced according to the present invention are more readily formed into emulsions than traditional waxes. More specifically, it has been found that the emulsible polyolefin wax can be emulsified at lower temperatures than conventional used. The emulsion temperature is preferably between about 140 and about 190° C., more preferably between 150 and about 175° C. with a temperature of about 160 to about 170° C. being most preferred.

Although the emulsion may be prepared at acidic, neutral or basic pH, it is preferred that the pH be between about 7 and about 12, preferably between about 8 and about 11 with a pH between about 9 and about 10 being most preferred.

The emulsions prepared according to the present invention generally contain about 10 to about 50 wt % emulsible polyolefin wax, preferably 20 to about 40 wt % with a weight percent of functionalized polypropylene wax of about 25 to about 35 wt % being most preferred.

The amount of surfactant, used in the emulsions of the present invention can be as high as about 20 wt % but is preferably between about 5 and about 15 wt % with a wt % of about 8 to about 12 being more preferred. Amounts much over about 15 wt % are generally not needed, however, minor amounts below about 3 wt % tend to be inadequate. Examples of suitable surfactants include Ingepal's CO series such as Ingepal CO-630, and Ingepal CO-710; nonylphenyl and ethoxylated alcohols such as Tergitol 15-S-9 and Tergitol 15-S-12.

The amount of water generally varies depending upon the desired concentration of the emulsion, but is generally between about 40 and about 80 wt %, preferably between about 50 and about 70 wt % with a wt % of about 60 to about 65 wt % water being most preferred.

Preferably, a base is generally added to the emulsion to render the aqueous solution basic, and is typically selected from standard bases such as tertiary amines and potassium hydroxide. Amounts of base may range up to about 10 wt %, preferably about 1 to 8 wt %, more preferably, about 2 to about 6 wt % with about 3 to about 4 wt % base being most preferred.

The emulsion can also contain other ingredients such as bleaching agents or whitening agents such sodium met-abisulfite. Although the bleaching agent or whitening agent is generally not needed, minor amounts often do decrease the color. The concentration of the bleaching agent may be as high as about 1 wt %, but is preferably about 0.1 to about 0.5 wt %, and more preferably about 0.2 to about 0.4 wt %.

The commercial applications for emulsions of the present invention are wide spread and include, for example, coatings in specific applications such as in floor polishes where the emulsion imparts gloss, slip and mar resistance, in coating inorganic substrates such as glass or mineral fillers, or in "overprint" coating where high clarity is required, or as pigment dispersants in plastics.

Floor waxes of the present invention comprise emulsions of the emulsible polyolefin wax as well as additional materials used in standard floor polishes such as coalescing aids, acrylic polymers, plasticizers and polyethylene waxes. The amounts of coalescing aids such as glycol ethers can vary from about 1 to about 10 wt %, preferably about 1 to about 8 wt % with an amount of about 4 wt % being most preferred. The amount of acrylic polymers such as styrene acrylic copolymers can vary from about 10 to about 20 wt %, preferably about 8 to about 15 wt % with an amount of about 6 to about 12 wt % being most preferred The plasticizers can vary from about 1 to about 5 wt % preferably about 1 to about 4 wt % with an amount of about 1.5 to about 3 wt % being most preferred. The amount of wax can vary from about 0.4 to about 3 wt %, preferably about 0.5 to about 2 wt % with an amount of about 1.2 to about 1.5 wt % being most preferred.

In addition to floor waxes and other emulsified derivatives, it has been found that the readily-emulsified, functionalized wax of the present invention can also act as a "carrier" to emulsify other substances which tend to be difficult or impossible to emulsify individually. Accordingly, the functionalized wax of the present invention can be mixed with at least a second substance in an aqueous medium under conditions described above for forming an emulsion. The second substance in this case usually has a higher Mw and imparts toughness to compositions of the emulsion. This way, the emulsible polyolefin wax of the present invention can introduce into a composition one or more substances and thereby their properties, which otherwise have been unavailable due to the inability to emulsify the substances.

The following examples are illustrative of the practice of the present invention.

EXAMPLES

Example 1

This example shows the superior physical properties of emulsions of the present invention over emulsions prepared from prior art waxes.

The thermally degraded polypropylenes (ACX1089, ACX1172, or blends thereof) from AlliedSignal, Inc., were melted at a temperature of 190° C., sparged with nitrogen gas, and agitated. The reactant monomer, maleic anhydride, and catalyst DTBP, were fed into the reaction mass at very precise rates over a period of 1 hour with the catalyst feed rate exceeding the maleic anhydride feed rate by 25%. The products were sparged with nitrogen to remove by-products and discharged. The resultant products 597 and 1221 Waxes had a saponification number from 30 to 90 mg KOH/g depending on the amount of maleic anhydride charged, grafting efficiency typically 70–75%, viscosity 300 to 900 cps at 190° C., and Gardner color 8 or less. The MW of the products were typically less than 25,000 and w/n less than 5.

Emulsions of the above were made by adding 200 g of the polypropylene wax to a high pressure reactor, with "x" grams of KOH and "y" grams of surfactant (see table 1) and the appropriate amount of water for the solids desired. Designed experiments were used to specify x and y. A typical commercial, maleated PP, Epolene E43 from Eastman Chemical Comp., was used as the control. This is nearly equivalent in MW and viscosity to Wax 597 but made by a different chemical process with different feedstock. Emulsion clarity data is provided below in Table 1, and emulsion particle size data is provided below in Table 2.

TABLE 1

Emulsion Clarity Data

| Run | Sap No. (d) | Surf (g) (d) | Agitation (RPM) | Solids (g) | pH | Klett | % T |
|---|---|---|---|---|---|---|---|
| Wax 597 | 25 | 60 | 300 | 41 | 10 | 28 | 55 |
|  |  |  |  |  | 8.9 | 27 | 52.4 |
| Wax 1221(a) | 11 | 60 | 300 | 40 | 8.7 | 55 | 32.5 |
| E3 (b) | 19 | 50 | 200 | 40 | 9.5 | 510 | 0.1 |
| E3 (c) | 25 | 60 | 300 | 40 | 12.8 | 380 | 0 |

Notes:
(a) KOH adjusted for saponification number
(b) Emulsification temperature at 175° C., 200 grams wax, water to the appropriate solids (~400 grams), Igepal CO710, with KOH.
(c) Klett is another indicator of emulsion clarity/particle size (lower number, smaller particle size)
(d) Transmittance & Klett were measured on the emulsions with no dilution

TABLE 2

Emulsion Particle Size Data

| Wax | Wax Typical Viscosity (cps 190° C.) | Particle Size Distribution in Nanometers | | | Klett | % T |
|---|---|---|---|---|---|---|
|  |  | dw | dn | dz |  |  |
| 597 | 300–400 | 15.8 | 6.4 | 22.0 | 27 | 55 |
| 1221 | 600–900 | 24.4 | 16.6 | 41.2 | 58 | 32 |
| E43 | 300–400 | 36.4 | 8.9 | 91.0 | 380 | 0 |

The results showed that both the 597 and 1221 Waxes when emulsified using a preferred formulation, produced emulsions of exceptional clarity and small/uniform particle size (i.e. dz/dw Wax 597 vs the control, 1.39 vs 2.5 respectively).

Example 2

In this example co-emulsions of Wax 597 with a high molecular weight, low saponification number (Mw 50,000, SN about 20 mg KOH/g) maleated Polypropylene which was internally synthesized (commercial Montell feedstock) were made as previously described in Example 1. FIG. 1 shows the Klett/clarity of the emulsion as a function of the Mw of the typically unemulsible polypropylene. Therefore, the data showed that Wax 597 acted as a "carrier" (surfactant) to help bring the hard to emulsify, high MW polymer into the emulsion and increase overall emulsion clarity.

Example 3

This example shows the application of the waxes of the present invention in floor wax. The emulsions were put into typical commercial Rohm & Haas Styrene/Acrylic floor polish formulation and tested versus the control for typical end-use properties.

TABLE 3

| Performance Test | 10/23 Floor Polish Performance Data | | |
|---|---|---|---|
| | Wax 597 | Wax 1221 | E43 |
| WOVC Tiles 20° Gloss | | | |
| Initial | 20.6 | 21 | 19.2 |
| Burnish | 24.7 | 26.2 | 24.4 |
| Change | 4.1 | 5.2 | 5.2 |
| WOVC Tiles 60° Gloss | | | |
| Initial | 57.1 | 57.7 | 58.3 |
| Burnish | 57.2 | 62.5 | 59.6 |
| Change | 0.1 | 4.8 | 1.3 |
| SCOF | | | |
| Initial | 0.61 | 0.58 | 0.63 |
| Burnish | 0.48 | 0.45 | 0.5 |
| Change | −0.13 | −0.13 | −0.13 |
| Mar/Traffic | | | |
| Black Mark | −1 | 0 | Reference/Control |
| Erasure | −1 | | Reference/Control |

Key as compared to the control:
−2 worse than, −1 slightly worse, 0 equal, +1 slightly better +2 better
(Note Mar is a very subjective test)

The data above shows that the 597 and 1221 Waxes have positive performance characteristics in floor polish and can be substituted into commercial floor polish formulations.

What is claimed is:

1. An emulsible polyolefin wax having sufficient functionality to be emulsible in an aqueous medium, a melt viscosity of less than 1,000 cps at 190° C., a Gardner color index of no greater than about 9, and an emulsion light transmittance of at least 10% at 525 nm with a 20 mm light pathlength, wherein said wax is prepared by reacting maleic anhydride with a starting material of either polypropylene or ethylene-propylene copolymer, wherein said ethylene-propylene copolymer comprises less than about 10% by weight of ethylene, and wherein said maleic anhydride is added to said starting material at a rate of about 8 to 12 wt. % of said starting material per hour.

2. The emulsible polyolefin wax of claim 1, wherein said emulsion light transmittance is at least about 30%.

3. The emulsible polyolefin wax of claim 2, wherein said wax has a Mw of about 10,000 to about 20,000, a melt viscosity of about 200 to about 800 cps, and an emulsion light transmittance of at least about 50%.

4. A batch process of producing the emulsible polyolefin wax of claim 1, said process comprising adding ethylenically unsaturated polycarboxylic compound to an agitated reactor charged with a polyolefin wax having a Gardner color of no greater than about 2, said ethylenically unsaturated polycarboxylic compound being added at a feed rate of about 1 to about 5 wt % of said polyolefin wax per hour under conditions sufficient to form the emulsible polyolefin wax of claim 1, wherein the concentration of said ethylenically unsaturated polycarboxylic compound added to said reactor is about 0.1 to about 25 wt. % of said polyolefin wax, and wherein said polyolefin wax is a polypropylene or ethylene-propylene copolymer wax, wherein said ethylene-propylene copolymer comprises less than about 10% by weight of ethylene, and said ethylenically unsaturated polycarboxylic compound is maleic anhydride.

5. The process of claim 4, wherein said process is a batch process and wherein said reactor is charged with said polyolefin wax and said ethylenically unsaturated polycarboxylic compound is fed at substantially constant rate to said reactor over a period of about 0.5 to about 10 hours, and wherein the concentration of said ethylenically unsaturated polycarboxylic compound added to said reactor over said period is about 0.1 to about 25 wt. % of said polyolefin wax.

6. The process of claim 5, wherein said ethylenically unsaturated polycarboxylic compound is fed to said reactor at a rate of about 2 to about 4 wt % of said polyolefin wax per hour.

7. The process of claim 5, wherein said reaction is conducted in the presence of a free radical source.

8. The process of claim 5, wherein said free radical initiator is an organic peroxide said organic peroxide being fed to said reactor at a rate of about 0.1 to about 1 wt % of starting material per hour.

9. The process of claim 4, wherein the reactor is charged with a blend of said polyolefin wax and at least another polyolefin wax, wherein said at least another polyolefin wax has a Mw greater than that of said polyolefin wax.

10. The product from the process of claim 4.

11. The product from the process of claim 9.

12. A composition comprising the product of claim 11.

13. A method of using a emulsible polyolefin wax having sufficient functionality to be emulsible in an aqueous medium, a melt viscosity of less than 1,000 cps at 190° C., and an emulsion light transmittance of at least 10% at 525 nm with a 20 mn light pathlength to emulsify at least one substance which is not otherwise emulsifiable individually in an aqueous medium, said method comprising mixing said emulsible polyolefin wax of claim 1 with said substance in an aqueous medium to emulsify both said emulsible polyolefin wax and said substance.

14. The method of claim 12, wherein said substance has a Mw greater than that of said emulsible-polyolefin wax.

15. The method of claim 13, wherein said is prepared by reacting maleic anhydride with polypropylene or ethylene-propylene copolymer.

16. The emulsible polyolefin wax of claim 1 having a Gardner Color index of no greater than 7.

17. The emulsible polyolefin wax of claim 1, wherein said wax has a saponification number of about 20 to about 150 KOH/g.

18. The emulsible polyolefin wax of claim 1, wherein said emulsible polyolefin wax has an emulsion % transmittance at 525 nm with a 20 mm light pathlength of at least about 50%.

* * * * *